April 26, 1949.  W. E. WILSON  2,468,583
CONTACT MECHANISM
Filed Dec. 30, 1947
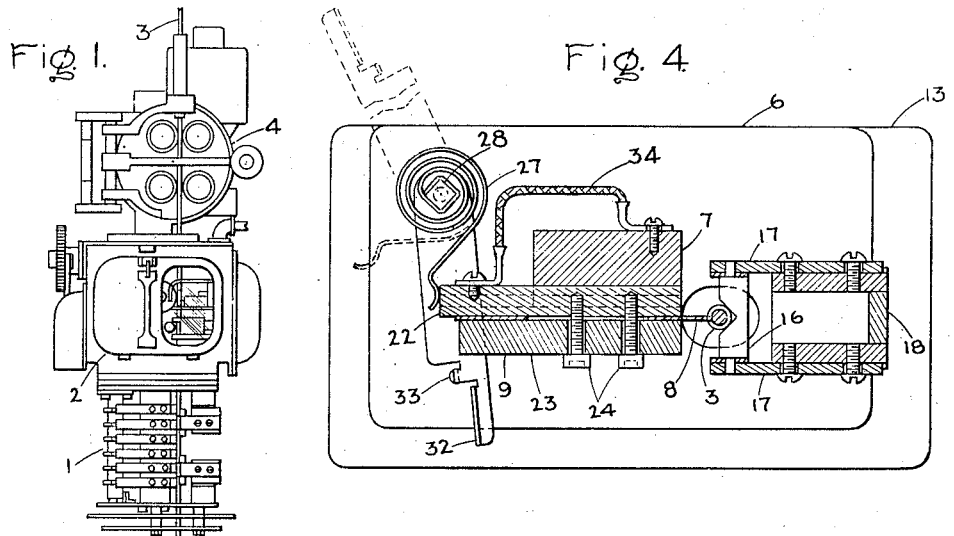
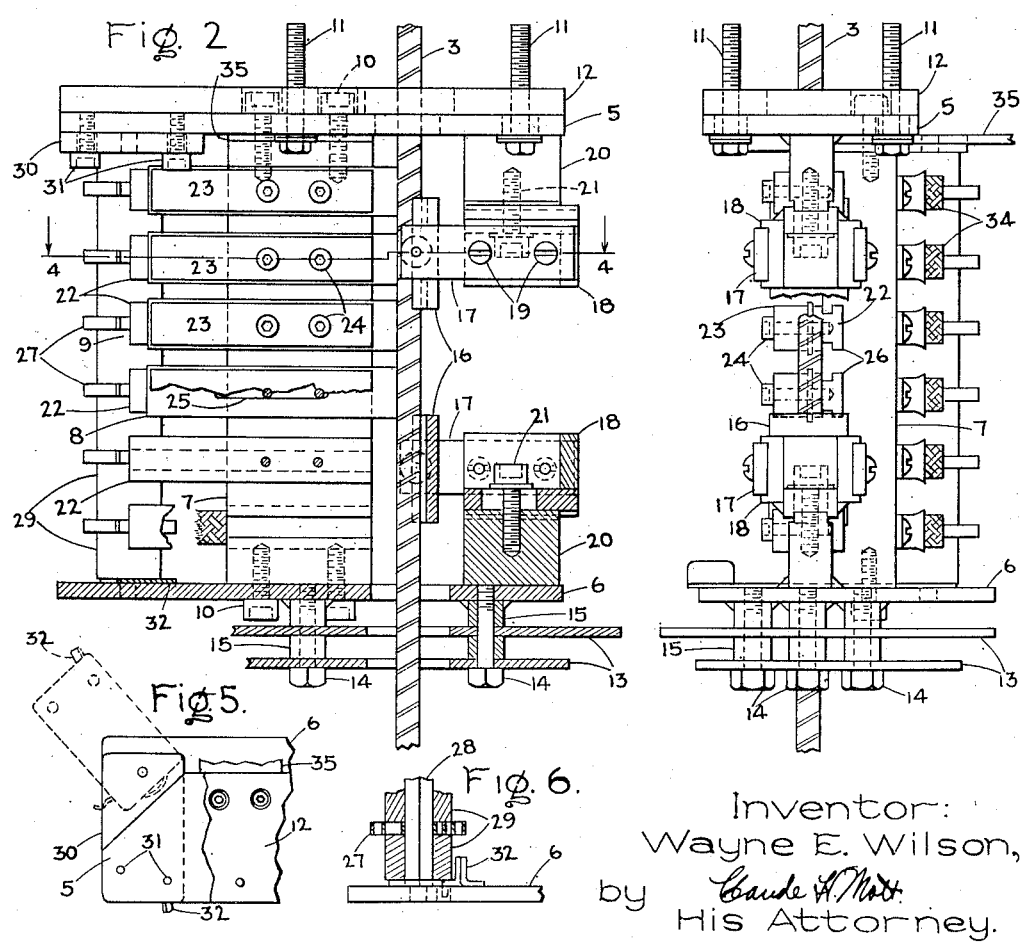
Inventor:
Wayne E. Wilson,
by Claude A. Mott
His Attorney.

Patented Apr. 26, 1949

2,468,583

UNITED STATES PATENT OFFICE 2,468,583

CONTACT MECHANISM

Wayne E. Wilson, Schenectady, N. Y., assignor to General Electric Company, a corporation of New York Application December 30, 1947, Serial No. 794,717

6 Claims. (Cl. 314—129)

My invention relates to arc welding apparatus and more particularly to a contact mechanism for supplying electric current to an electrode fed through the contact mechanism.

A contact mechanism embodying my invention is particularly suited for supplying welding current to a metal electrode fed by an automatic arc welding machine. In automatic arc welding machines the arc is maintained by feeding an electrode toward the work as it is consumed by the arc. In fully automatic machines the rate of feed is controlled in accordance with a characteristic of the arc which varies with its departure from a desired operating condition such, for example, as arc voltage. In some of these machines this feeding mechanism may also move the electrode away from the work in order to accommodate inequalities of the work surfaces and to provide means for striking the welding arc.

The electrode employed is usually provided with a coating containing one or more materials having a beneficial effect on the arc and weld metal. These materials are commonly referred to as fluxes. In the heat of the arc they provide an atmosphere which stabilizes the arc and protects the fused electrode material as well as the fused work parts from the surrounding atmosphere. In most cases the reaction products of the flux form a slag which covers the weld and, like the slag in a furnace, has a beneficial effect on the molten weld metal.

When the electrode is bare or substantially bare, the welding current may be readily supplied to the electrode by a contact mechanism including one or more rolls or sliding contacts which are in engagement therewith. Due to the high arc welding current densities employed, the contact mechanism usually engages the electrode at a point near its arcing terminal and is provided with more than one contact or brush. If the flux coating on the electrode is of substantial thickness some means must be provided for removing a portion of this coating and this is usually done by slotting the coating lengthwise of the electrode in order to bare the metallic core thereof for engagement with the current conducting element or elements of the contact mechanism. It is quite desirable to cut a very narrow slot through the flux coating on the electrode in order to remove the minimum amount of fluxing material therefrom.

It is an object of my invention to provide a contact mechanism which is particularly suited for supplying welding current to the metallic core of a flux coated arc welding electrode through a narrow slot formed lengthwise thereof through its flux coating.

It is another object of my invention to provide an arrangement in which thin strip material is employed as contacts for engaging the electrode and supplying current thereto and in which overheating of these contacts is prevented by means of their holders which make an intimate engagement with the contacts over an extended area and which are of greater size and mass than the contacts in order to readily absorb and radiate the heat generated in the contacts.

It is a further object of my invention to provide a contact mechanism in which the arrangement of parts is such as to provide for adjustments to compensate for the wear of the current carrying electrode engaging elements thereof and in which the elements are so arranged relative to one another as to accommodate straight electrodes or electrodes having a curvature, such as occurs when the electrode is supplied from a coil as is frequently the case in automatic arc welding machines.

It is also an object of my invention to provide a contact mechanism in which the current carrying contacts or brushes are formed of a material having self-lubricating qualities to an extent which prevents galling or seizing of the surfaces thereof which are held in engagement with the electrode.

Further objects of my invention will become apparent from the following description of the embodiment thereof illustrated in the accompanying drawing.

In this drawing Fig. 1 is an illustration showing the contact mechanism of my invention as part of an automatic arc welding machine which is suitable for feeding heavily coated arc welding electrodes. Figs. 2 and 3 of this drawing are respectively side and end views with portions broken away and sectioned in order to show the structure and arrangement of parts. Fig. 4 is a sectional view along the lines 4—4 of Fig. 2 and Figs. 5 and 6 are detail views showing respectively the arrangement of parts for removably supporting the shaft of the spring biasing means forming a part of the contact mechanism and for holding this shaft in its operating position in the contact mechanism.

In accordance with the illustrated embodiment of my invention the electrodes engaging contacts or brushes of the contact mechanism are formed of thin strips of contact material. They are prevented from overheating by being supported in holders which engage them along an extended area and conduct the heat therefrom for radiation to the surrounding atmosphere. These holders also act as a means for introducing welding current into the contacts and for yieldingly biasing them into engagement with the electrode. The contacts are adjustable lengthwise of their holders and may be reversed relative thereto so that as one end portion is consumed by the wear of friction, they may be adjusted relatively to their holders or turned end for end therein so that a large portion of each contact may be used before it becomes necessary to discard the contact and replace it with a new one. In order to prevent galling at the electrode engaging surfaces of these contact strips they are preferably formed of a cupreous material containing a small percentage of lead. I have used copper containing about one per cent of lead and about one-half of one per cent of selenium.

The contacts and their holders are mounted in guides in a frame or support and are held in engagement with the electrode by a biasing means acting against the support and the holders. The biasing means comprises a plurality of involute torsion springs having their inner portions mounted on a shaft which is rotatable in the frame to move their outer ends both into and away from yielding engagement with the contact holders. This supporting shaft is latched in its operating position and may be readily removed from the frame for replacement of damaged parts by reason of the demountable construction employed.

The electrode is guided through the contact mechanism by a plurality of shoes having grooved guiding surfaces against which one side of the electrode is held by the pressure exerted on the other side of the electrode by the spring biased contacts. These shoes are supported for rotation about an axis at right angles to their grooved guiding surfaces by a bearing structure which is adjustable on the frame of the contact mechanism to accommodate straight or curved electrodes and to position the axis of the electrode in the mechanism.

In Fig. 1 of the drawing, a contact mechanism embodying my invention is shown at 1 as being supported on the housing of a grinder mechanism 2 which is employed for cutting a slot through the coating of the welding electrode 3 to bare the core thereof for engagement with the current conducting contacts of the contact mechanism. The electrode is fed through the grinder and contact mechanism to the arc by the automatic arc welding head 4 on which the grinder mechanism is supported.

The automatic arc welding head may be of the construction illustrated and claimed in U. S. Letters Patent 2,272,158, Jasper E. Anderson, granted February 3, 1942 and assigned to the assignee of this invention. The grinder mechanism forms the subject matter of my copending application Serial No. 763,555, filed July 25, 1947. This grinder mechanism comprises a disc-type grinding wheel which is used for cutting a narrow slot extending through the flux coating of the electrode into the metallic core thereof. It also embodies a gauging mechanism for automatically controlling the adjustment of the grinding wheel so as to compensate for its wear. The gauging mechanism of this grinder is supported so as to be bodily movable with the electrode projecting beyond the grinding wheel so that an accurate gauging of the depth of the cut produced by the grinding wheel may be obtained without unnecessarily restraining the movement of the electrode through the grinding mechanism.

The structure and arrangement of parts of my improved contact mechanism are illustrated in the remaining figures of the drawing of which Figs. 2 and 3 are respectively side and end views with portions sectioned or broken away to illustrate fully the nature and arrangement of parts, and Fig. 4 is a sectional view thereof along lines 4—4 of Fig. 2.

As shown in Figs. 2, 3 and 4, the frame or body portion of the contact mechanism is formed by bolting upper and lower end plates 5 and 6 to the ends of a guide plate 7 in which the contacts 8 and the holders 9 therefor are slidably mounted for movement toward and away from the electrode 3. The bolts 10 of this assembly pass through plates 5 and 6 into threaded engagement with the ends of the guide plate 7. The contact mechanism may be attached to its support, for example the lower surface of the grinder housing 2, by means of bolts 11 which pass through the upper plate 5 and through a plate 12 of insulating material into threaded engagement with the mounting plate, forming part of the grinder housing. The bolts 11 are provided with washers and bushings to electrically insulate them from the upper plate 5 which is also electrically insulated from its supporting structure by plate 12.

The contact mechanism is protected from the heat of the welding arc by means of a heat shield comprising baffle plates 13 which are attached to the lower plate 6 thereof by bolts 14 which pass through these plates and spacing washers 15 located between and spacing them and this lower plate. The baffle plates 13 not only shield the contact mechanism from the heat of the arc but also serve as a radiating means for dissipating the heat imparted thereto by the welding arc.

The electrode 3 extends through elongated holes in the plates 12, 5, 6 and 13 of the contact mechanism and is positioned in the contact mechanism by means of shoes 16 constituting an electrode guide. Each of the shoes 16 is provided with a grooved face against which one side of the electrode 3 is held by the pressure exerted on its other side by the contacts 8 of the contact mechanism. These shoes 16 are pivotally supported between the projecting ends of arms 17 for rotation about axes at right angles to their grooved electrode guiding faces. The inner ends of the arms 17 are located in the grooved sides of brackets 18 to which they are attached by screws 19. The brackets 18 are mounted on supporting blocks 20 which in turn are attached to the upper and lower plates 5 and 6 of the contact mechanism.

The brackets 18 are slidably mounted on their support blocks 20 for movement toward and away from the electrode and are held in adjusted positions relative to these support blocks by bolts 21 which pass through an elongated slot in the base of each bracket into threaded engagement with its supporting block. The tongue and grooved connection between the base of each bracket and the surface of the block engaged thereby insures proper seating of the contacting surfaces thereof and prevents turning of the brackets on their support blocks when the holding screws are tightened or released in order to adjust the bracket and the electrode engaging shoes 16 supported thereon.

In order to reduce to a minimum the width of the contact slot formed in the flux-coated electrode by the grinder mechanism 2, the contacts or brushes 8 of my contact mechanism are elongated blades made of thin strips of electrically conductive material having a substantially uniform cross-section. These contact blades are prevented from overheating by being supported in holders 9 of greater mass which absorb and conduct the heat therefrom for radiation to the surrounding atmosphere.

The extended area of contact between each contact and its holder also facilitates the supply of welding current from each holder to its contact. The electrical circuits of each contact will be described below. As best shown in Fig. 4 of the drawing, the holder 9 is formed of two members 22 and 23 between which the strip of contact material 8 is sandwiched and held with an adjustable extension toward the electrode by means of bolts 24 which pass through the clamping member 23 into the guiding member 22 of the holder. The central portion of each contact is provided with an elongated slot 25 and each contact is made so that initially it is symmetrical with regard to this slot so that as one end of the contact wears to a degree such that it can no longer be adjusted for the desired extension from its holder 9 due to the limitations imposed by the length of the slot, the contact may be reversed end for end in its holder so as to present the other end thereof toward the electrode with an adjustable portion of this other end extending from its holder.

Each of the guide members 22 of the holders 9 is grooved lengthwise of its sides for engagement with the edges of dovetail slots 26 formed in the guide plate 7. These slots 26 extend across the face of the guide plate 7 and are parallel with one another. They direct the holders 9 and the contacts 8 therein along paths of travel toward and away from the electrode which extend lengthwise of the contacts 8 and bring the projecting end portions of these contacts into normal engagement with the core of the electrode.

The ends of the contacts 8 are biased into engagement with the core of the electrode by means of torsion springs 27, the inner ends of which are supported on a square shaft 28 for turning movement therewith. The outer ends of these springs 27 engage the ends of the members 22 of each of the holders 9 of the contact mechanism. These springs are positioned relative to one another on the shaft 28 by means of tubular spacing members 29 which locate each spring opposite its associate contact holder.

The shaft 28 is provided with journals which project beyond positioning shoulders at each end thereof. These journals are mounted in bearings one of which is in the end plate 6 and the other of which is in a support plate 30 forming a detachable portion of the frame structure of the contact mechanism. The bearing for the journal at one end of shaft 28 is located near one end of the plate 30. The other end of this plate is attached to and seated against the under surface of an end portion of the upper plate 5 by means of bolts 31. The corner of the upper plate 5 which is adjacent to shaft 28 is cut away to an extent such that when the support plate 30 is detached from the upper plate 5, it may be swung about the journaled end of shaft 28 to the position shown by dotted lines in Fig. 5 so that this support plate and its shaft 28 may be removed from the frame of the contact mechanism lengthwise of the longitudinal axis of the shaft 28. When the support plate 30 is in assembled position in the frame of the contact mechanism, the shaft 28 is located in the frame by the shouldered end portions thereof engaging this plate and the projecting end portion of the lower plate 6.

The shaft 28 may be rotated about its longitudinal axis in the frame of the contact mechanism through the agency of an arm 32, the inner end of which has a squared opening through which the lower end of the square shaft 28 projects. The outer end of this arm 32 is provided with an upturned portion by means of which the operator may manipulate the same. The outer end of this arm is also provided with a down turned portion forming a latch which engages plate 6 and holds the arm in a definite position relative thereto when this latch extends through a hole 33 which forms a catch therefor in plate 6. The inner end of the arm 32 is held between the lower spacing member 29 and the plate 6 and the outer end of the arm 32 may be sprung away from plate 6 to release its latch from the hole 33 thereof. The latch position of arm 32 holds the shaft 28 in that position in which the outer ends of each of the springs 27 engage the members 22 of the electrode holders 9 and bias them into yielding engagement with the core of the electrode 3. When the latch is disengaged from its catch and swung away from the electrode, the holders for the contacts 8 are released so that the contacts may be readjusted in their holders.

Welding current is supplied to each of the contacts 8 through flexible conductors 34 one end of each of which is attached to the back of the guide plate 7 and the other end of which is attached to each of the members 22 of the electrode holders. The guide plate 7 is connected in the welding circuit through the agency of a bus bar 35, the inner end of which is brazed to the upper end of the guide plate 7 and the outer end of which (not shown) is connected with one terminal of the welding conductors employed for supplying electric current to the arc. The members 22 and 23 of each holder 9, as well as the guide plate 7, may be formed of brass and bus bar 35 may be formed of copper.

When the contact groove is formed in the electrode by means of grinding, the bottom of the groove formed in the core of the electrode is quite smooth and consequently conducive to forming an excellent electrical connection with the projecting end of each of the brushes or contacts 8 of the contact mechanism. Due, however, to the intimate contact thus provided, it was found that if the contacts were made of metals or alloys usually employed for this purpose, they would frequently seize or gall and consequently interfere with regulation of electrode feed. I have found that if the contacts are formed of cupreous material containing lead this difficulty can be avoided. The particular material which I have employed is formed of about one per cent lead, one-half of one per cent selenium, and the remainder copper. The lead present in this alloy acts as a lubricant and prevents the electrode engaging surfaces of the contacts from galling thus maintaining the desired electrical conductivity of these surfaces of the contacts.

The operation of the contact mechanism is believed to be quite obvious from the description given above. In use the electrode is fed through the contact mechanism and is positioned therein by the grooved shoes 16. The projecting ends of each of the brushes or contacts extend through the cut in the electrode and engage the core thereof. These contacts are held in yielding engagement with the electrode by the spring mechanism above described. Each of the brushes or contacts 8 may be adjusted relative to their holders in order to project the desired amount therefrom and as they wear due to their frictional engagement with the core of the electrode they may be readjusted in their holders in order to compensate for this wear. After the end of any particular contact has worn down to an extent such that it can no longer be further extended by the desired amount from its holder, the contact may be reversed end for end in its holder to establish thereby that relationship which will permit for further adjustment to compensate for wear while maintaining the desired projection of the contact from its holder. As previously stated, the contacts are prevented from over-heating by radiation of the heat therefrom through the agency of their holders which are made quite massive in comparison to the size of the contacts. These holders also stiffen the blade-like contacts.

If, for any reason, one of the contact holders of my contact mechanism becomes damaged in use, the construction employed is such that the damaged holder may be readily withdrawn from the contact mechanism by rotating shaft 28 so that the ends of the springs 27 are moved to an inoperative position which clears the lengthwise movement of these holders from their dovetail grooves in the guide plate 7 in which they are mounted. Furthermore, if it becomes necessary to renew any of the biasing springs 27 of the contact mechanism because of some damage inflicted thereon, the shaft 28 may be readily disassembled from the contact mechanism by reason of the construction embodying the mounting plate 30. It will be seen that a contact mechanism in accordance with my invention provides an arrangement of parts permitting the easy replacement of damaged portions thereof.

It is quite apparent that by proper adjustment of the bearing structures for each of the guide shoes 16 relative to the supports therefor and by proper adjustment of the projection of the contacts 2 from their holders 9, my contact mechanism may be used for supplying welding current to a curved electrode. Frequently there is a residual curvature in the electrode resulting from its being supplied in coil form. If the electrode is of substantial cross-section it is quite difficult to remove this residual curvature after the electrode has been withdrawn from its coil and fed by the arc welding head through the contact mechanism to the work. Especially is this true if the electrode is provided with a heavy coating which may chip from the electrode if straightening pressure is applied thereto. It is, of course, obvious that my invention is not limited in its application for supplying welding current to flux coated electrodes, since it may be used with equal facility to supply welding current to bare electrodes.

Contact mechanisms embodying my invention may be variously modified without departing from the spirit and scope of my invention as exemplified in the above described embodiment thereof. Thus, while I have shown and described but one embodiment of my invention, it will be understood that I intend to cover by the appended claims all such modifications of my invention as fall within the true spirit and scope thereof.

What I claim as new and desire to secure by Letters Patent of the United States is:

1. A contact mechanism for connecting a source of welding current to an arc welding electrode fed therethrough, said contact mechanism comprising an elongated contact blade having end portions adapted to engage and complete an electrical connection with said electrode, a heat absorbing and heat dissipating holder in which said contact blade is reversibly supported for endwise adjustment with a short length of either end thereof projecting from said holder, a support in which said holder is mounted for lengthwise movement toward and away from said electrode, a guide mounted on said support opposite and in the path of movement of said contact in said holder for directing an electrode past said contact and for resisting the pressure exerted thereon by said contact, means for supplying welding current to said holder and said contact blade mounted therein, a spring for yieldingly biasing said holder and said contact blade therein into engagement with said electrode, a member supporting said spring and rotatably mounted in said support for movement from an inoperative position in which it releases said holder for adjustment of said contact blade therein to an operative position in which it acts through said spring to bias said contact blade in said holder into yielding engagement with said electrode in said guide, and a latch attached to said member and engaging a catch on said support for holding said member in its operative position in said support.

2. A contact mechanism for connecting a source of welding current to an arc welding electrode fed therethrough, said contact mechanism comprising an elongated contact blade having end portions adapted to engage and complete an electrical connection with said electrode, a heat absorbing and heat dissipating holder having an extended area thereof in heat and electrically conductive engagement with said contact blade and on which said contact blade is reversibly supported for endwise adjustment with a short length of either end thereof projecting from said holder, a support having a guide in which said holder is mounted for movement of said contact blade toward and away from said electrode, an involute torsional spring, a shaft rotatably mounted on said support and on which the inner end of said spring is mounted for rotation therewith from a position in which said holder may be withdrawn from its guide in said support to a position in which it applies a yielding pressure to said holder which brings the end of said contact blade thereon into engagement with said electrode, an arm rotatable with said shaft and engaging said support to hold said shaft in that position in which said spring applies a yielding pressure to said holder, a shoe having a grooved guiding surface against which one side of said electrode is held by the pressure exerted on its other side by said contact blade, a bearing structure in which said shoe is mounted for rotation about an axis at right angles to its grooved guiding surface, and means for adjusting said bearing structure relative to said support to position said electrode in said mechanism.

3. A contact mechanism for connecting a source of welding current to an arc welding electrode fed therethrough, said contact mechanism comprising a shaft having journals projecting beyond positioning shoulders at each end thereof, a support having a detachable portion and a projecting portion each of which portions has a bearing for one of said shaft journals and between which portions said shaft is positioned by said shoulders on said shaft, said detachable portion of said support being rotatable about the journal at one end of said shaft to a position relative to the body of said support so that said shaft and said detachable portion journaled thereon may be moved lengthwise of said bearing in the projecting portion of said support for removing said shaft from said support, a contact mounted on said support for endwise movement toward and away from an electrode fed through said contact mechanism, means for supplying welding current to said contact, a guide mounted on said support for directing said electrode past said contact and for resisting the pressure exerted on said electrode by said contact, means mounted on said shaft and movable by rotation of said shaft from an operative position in which it applies a yielding pressure to said contact to move it into engagement with said electrode to an inoperative position in which it releases said contact from engagement with said electrode, and means for rotating said shaft and for holding it in a position in which said last mentioned means applies a yielding pressure to said contact.

4. A contact mechanism for connecting a source of welding current to an arc welding electrode fed therethrough, said contact mechanism comprising an electrically conductive, electrode engaging contact, means for supplying welding current to said contact, a support in which said contact is mounted for lengthwise movement toward and away from said electrode, a guide mounted on said support opposite and in the path of movement of said contact for guiding an electrode past said contact and for resisting the pressure exerted thereon by said contact, a shaft, means for mounting said shaft on said support for rotation about an axis substantially parallel to the path of travel of said electrode through said contact mechanism, said shaft having at each end thereof a shoulder and a journal extending beyond said shoulder and said mounting means for said shaft including a plate having a bearing and a seating surface respectively for said journal and said shoulder at one end of said shaft, a projecting portion of said support having a bearing and a seating surface respectively for said journal and said shoulder at the other end of said shaft, and a second projecting portion of said support to which one end of said plate is detachably secured with said bearing in its other end aligned with the bearing in said support, said second projecting portion of said support being cut away to permit passage of said shaft with the plate mounted on one end thereof when said one end of said plate is turned away from said support and the other end of said shaft is inserted endwise into said bearing in said support, an involute torsional spring rotatable with said shaft and having its inner end attached to said shaft and its outer end movable by rotation of said shaft from an inoperative position in which said contact may be withdrawn from engagement with said electrode to an operative position in which its said outer end exerts a yielding pressure on said contact to move said contact relative to its support into engagement with an electrode in said guide, and a latch attached to said shaft and engaging a catch on said support for holding said shaft and said spring mounted thereon with the outer end of said spring exerting said yielding pressure on said contact.

5. A contact mechanism for connecting a source of welding current to an arc welding electrode fed therethrough, said contact mechanism comprising a shaft having journals projecting beyond positioning shoulders at each end thereof, a support having a detachable portion and a projection portion each of which portions has a bearing for one of said shaft journals and between which portions said shaft is positioned by said shoulders on said shaft, said detachable portion of said support being rotatable about the journal at one end of said shaft to a position relative to the body of said support so that said shaft and said detachable portion journaled thereon may be moved lengthwise of said bearing in the projecting portion of said support for removing said shaft from said support, a contact blade of copper containing lead and having an end portion adapted to engage and complete an electrical connection with said electrode, a heat absorbing and heat dissipating holder on which said contact blade is supported for endwise adjustment with a short length thereof projecting from said holder, said holder being mounted for endwise movement along a guide in said support toward and away from said electrode and having an extended area thereof in heat and an electrically conductive engagement with said contact blade, an involute torsional spring having its inner end mounted on said shaft for rotation therewith and having its outer end movable by rotation of said shaft from a position in which said spring applies a yielding pressure to said holder to a position in which said holder may be withdrawn from its guide, an arm rotatable with said shaft and engaging said support to hold said shaft in that position in which said spring applies a yielding pressure to said holder, a shoe having a grooved guiding surface against which one side of said electrode is held by the pressure exerted on its other side by said contact blade, a bearing structure in which said shoe is mounted for rotation about an axis at right angles to its grooved guiding surface, and means for adjusting said bearing structure relative to said support to control the position of said electrode in said mechanism.

6. A contact mechanism for connecting a source of welding current to an arc welding electrode fed therethrough, said contact mechanism comprising an elongated contact blade of copper containing about one per cent of lead and about one-half of one per cent selenium and having end portions adapted to engage and complete an electrical connection with said electrode, a heat absorbing and heat dissipating holder in which said contact blade is reversibly supported for endwise adjustment with a short length of either end thereof projecting from said holder, a support in which said holder is mounted for lengthwise movement toward and away from said electrode, a guide mounted on said support opposite and in the path of movement of said contact in said holder for directing an electrode past said contact and for resisting the pressure exerted thereon by said contact, means for supplying welding current to said holder and said contact blade mounted therein, a spring for yieldingly biasing said holder and said contact blade therein into engagement with said electrode, a member supporting said spring and rotatably mounted in said support for movement from an inoperative position in which it releases said holder for adjustment of said contact blade therein to an operative position in which it acts through said spring to bias said contact blade in said holder into yielding engagement with said electrode in said guide, and a latch attached to said member and engaging a catch on said support for holding said member in its operative position in said support.

WAYNE E. WILSON.

REFERENCES CITED

The following references are of record in the file of this patent:

UNITED STATES PATENTS

| Number | Name | Date |
|---|---|---|
| 2,272,738 | Chapman | Feb. 10, 1942 |